(12) United States Patent
Schrumm

(10) Patent No.: US 6,386,049 B1
(45) Date of Patent: May 14, 2002

(54) PUMP FLOW TEST SYSTEM

(76) Inventor: Jonathan W. Schrumm, 20 Cliff Edge Cir., Cheshire, CT (US) 06410

( * ) Notice: Subject to any disclaimer, the term of this patent is extended or adjusted under 35 U.S.C. 154(b) by 0 days.

(21) Appl. No.: 09/519,977

(22) Filed: Mar. 7, 2000

(51) Int. Cl.[7] ................................................. G01F 1/46
(52) U.S. Cl. ............................................... 73/861.66
(58) Field of Search ............................. 73/861.65, 216, 73/861.66, 232, 861

(56) References Cited

U.S. PATENT DOCUMENTS

| | | | | |
|---|---|---|---|---|
| 3,876,009 A | * | 4/1975 | Johnson, Jr. .................. | 169/24 |
| 4,498,347 A | * | 2/1985 | Grantham et al. ....... | 73/861.66 |
| 4,526,234 A | * | 7/1985 | Little .......................... | 169/15 |
| 4,696,194 A | * | 9/1987 | Taylor ..................... | 73/861.66 |
| 5,082,013 A | * | 1/1992 | Scheib ........................ | 137/272 |
| 5,804,716 A | * | 9/1998 | McGuire et al. .............. | 73/198 |
| 5,899,111 A | * | 5/1999 | Zellers ........................ | 73/293 |
| 5,997,738 A | * | 12/1999 | Lin .......................... | 210/195.1 |
| 6,152,707 A | * | 11/2000 | Alnerg ..................... | 417/423.3 |

* cited by examiner

Primary Examiner—Max Noori
(74) Attorney, Agent, or Firm—Michael S. Neustel

(57) ABSTRACT

A pump flow test system for accurately measuring the aggregate fluid flow from all pumps of a fire truck. The inventive device includes a reservoir structure for storing a volume of fluid, an intake manifold having a plurality of intake inlets extending into the reservoir structure, an elongate tube extending into the reservoir structure from the intake manifold, a pitot tube positioned within the elongate tube for measuring fluid flow, and a meter attached to the pitot tube for displaying the water flow through the elongate tube. The elongate tube preferably has a cap and a perforated portion for allowing even distribution of the incoming water into the reservoir structure. In use, an intake hose is positioned within the reservoir structure for drawing water into the pumps of the fire truck. A plurality of dispensing hoses are connected to the pump of the fire truck and to the intake inlets of the intake manifold for delivering the water from the pumps of the fire truck to the reservoir structure.

14 Claims, 4 Drawing Sheets

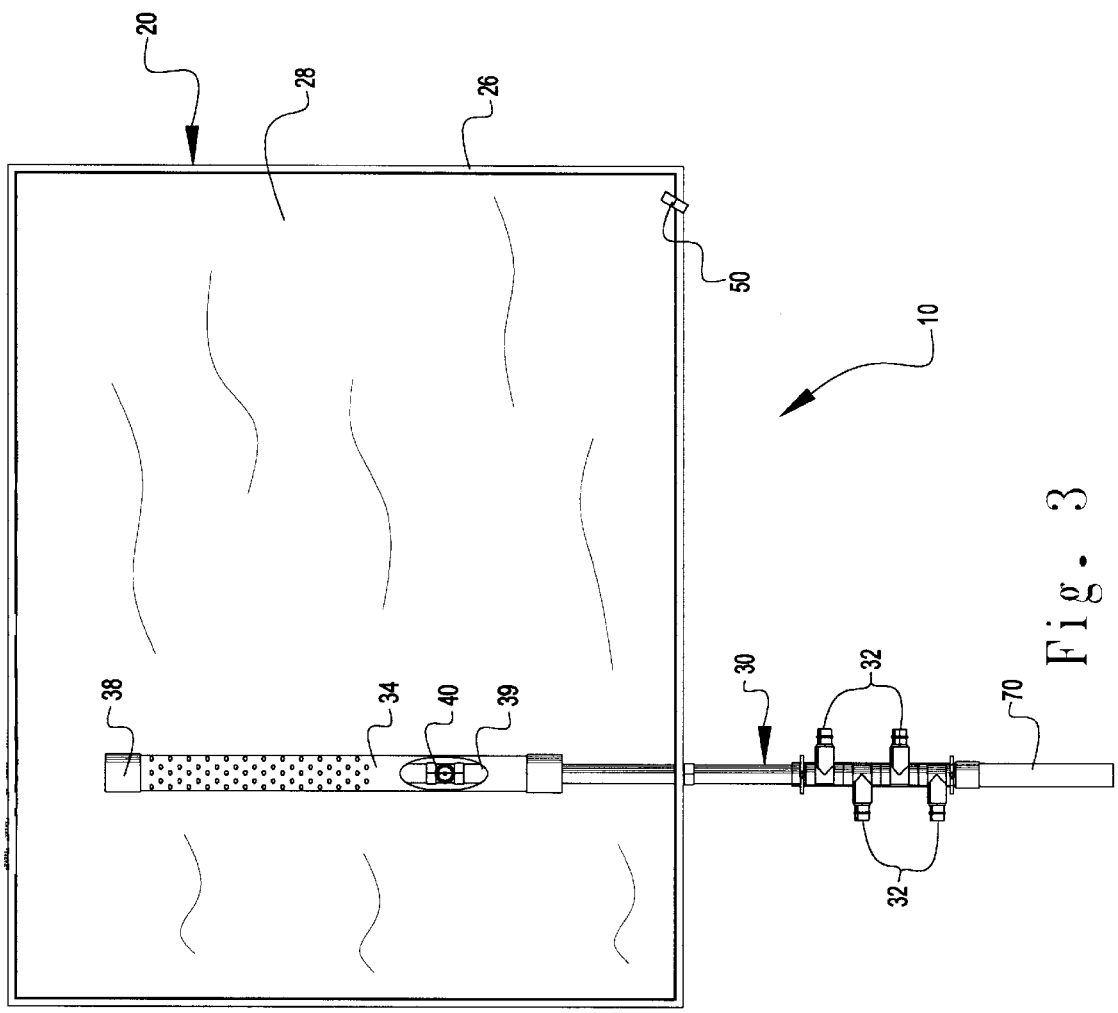

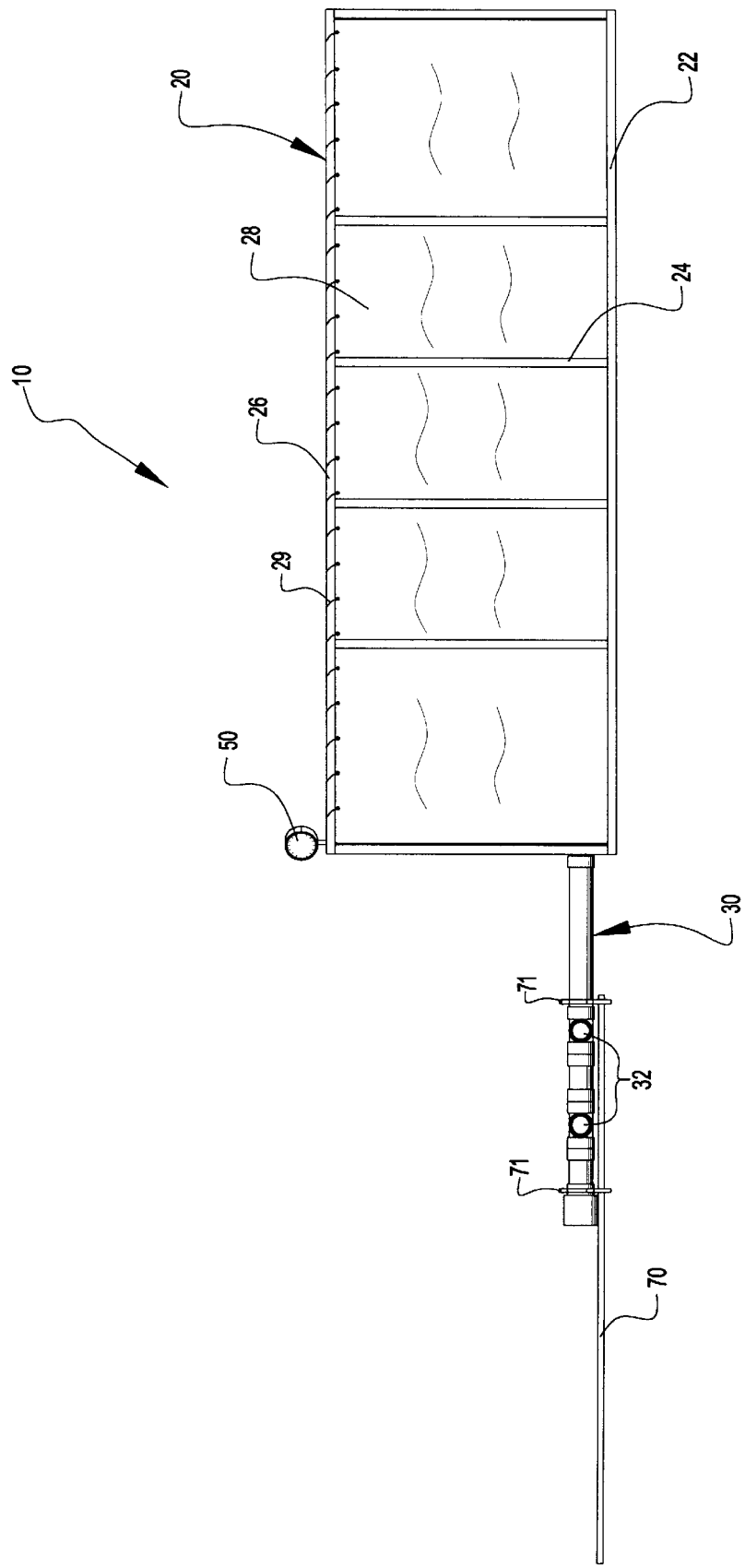

PUMP FLOW TEST SYSTEM

BACKGROUND OF THE INVENTION

1. Field of the Invention

The present invention relates generally to pump flow measuring devices and more specifically it relates to a pump flow test system for accurately measuring the aggregate fluid flow from all pumps of a fire truck.

The pumps of a fire truck are tested annually according to guidelines set by the National Fire Protection Association (NFPA). Most fire departments do not have the required facilities to conduct these tests because of large amounts of water that are required for testing. Some states have environmental statutes that prohibit any discharge of fluids into other bodies of water such as lakes or streams. Hence, there is a need for a pump flow test system that can be easily utilized by most fire departments.

2. Description of the Prior Art

Conventional methods of testing the pumps of a fire truck required the positioning of the fire truck adjacent a large body of water with the intake hose positioned within the water for drawing significant amounts of water into the pumps. This is undesirable for the reasons stated above, and there have been various attempts to improve upon this method of testing pumps.

Examples of pump testing devices include U.S. Pat. No. 5,804,716 to McGuire et al; U.S. Pat. No. 4,696,194 to Taylor; U.S. Pat. No. 4,498,347 to Grantham et al; U.S. Pat. No. 3,876,009 to Johnson, Jr. which are all illustrative of such prior art.

McGuire et al (U.S. Pat. No. 5,804,716) discloses an apparatus and method for testing standpipe flow. McGuire et al teaches a portable tank mounted on wheels, a pipe assembly with a pressure gauge, a flow meter, a shut-off valve, and a high pressure hose connectable to the valve being tested.

Taylor (U.S. Pat. No. 4,696,194) discloses a fluid flow measurement system. Taylor teaches a sensing probe for use in determining fluid flow rates along a duct having a probe pipe mounted within a wall of the duct.

Grantham et al (U.S. Pat. No. 4,498,347) discloses a fluid flow measuring system. Grantham et al teaches a means for ensuring the accuracy and reliability of fluid flow measurements.

While these devices may be suitable for the particular purpose to which they address, they are not as suitable for accurately measuring the aggregate fluid flow from all pumps of a fire truck. Conventional methods of measuring fluid flow from a plurality of pumps within a fire truck require a large body of water not commonly found.

In these respects, the pump flow test system according to the present invention substantially departs from the conventional concepts and designs of the prior art, and in so doing provides an apparatus primarily developed for the purpose of accurately measuring the aggregate fluid flow from all pumps of a fire truck.

SUMMARY OF THE INVENTION

In view of the foregoing disadvantages inherent in the known types of fluid measuring devices now present in the prior art, the present invention provides a new pump flow test system construction wherein the same can be utilized for accurately measuring the aggregate fluid flow from all pumps of a fire truck.

The general purpose of the present invention, which will be described subsequently in greater detail, is to provide a new pump flow test system that has many of the advantages of the fluid measuring devices mentioned heretofore and many novel features that result in a new pump flow test system which is not anticipated, rendered obvious, suggested, or even implied by any of the prior art fluid measuring devices, either alone or in any combination thereof.

To attain this, the present invention generally comprises a reservoir structure for storing a volume of fluid, an intake manifold having a plurality of intake inlets extending into the reservoir structure, an elongate tube extending into the reservoir structure from the intake manifold, a pitot tube positioned within the elongate tube for measuring fluid flow, and a meter attached to the pitot tube for displaying the water flow through the elongate tube. A recoil tab is preferably utilized for restraining the nozzle reaction from the discharge from pushing the elongate tube from the tank. The elongate tube preferably has a cap and a perforated portion for allowing even distribution of the incoming water into the reservoir structure. In use, an intake hose is positioned within the reservoir structure for drawing water into the pumps of the fire truck. A plurality of dispensing hoses are connected to the pump discharges of the fire truck and to the intakes of the intake manifold for delivering the water from the pumps of the fire truck to the reservoir structure.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a pump flow test system that will overcome the shortcomings of the prior art devices.

Another object is to provide a pump flow test system that accurate measures the aggregate fluid flow from a plurality of water pumps and hoses.

An additional object is to provide a pump flow test system that is easy to utilize for most fire departments or testing authorities.

A further object is to provide a pump flow test system that does not require access to a large water source.

Another object is to provide a pump flow test system that is compact and transportable to various locations.

A further object is to provide a pump flow test system that has little environmental damage because of limited water run-off.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is a top view of the present invention.

FIG. 4 is a side view of the present invention.

DESCRIPTION OF THE PREFERRED EMBODIMENT

Figure 1:
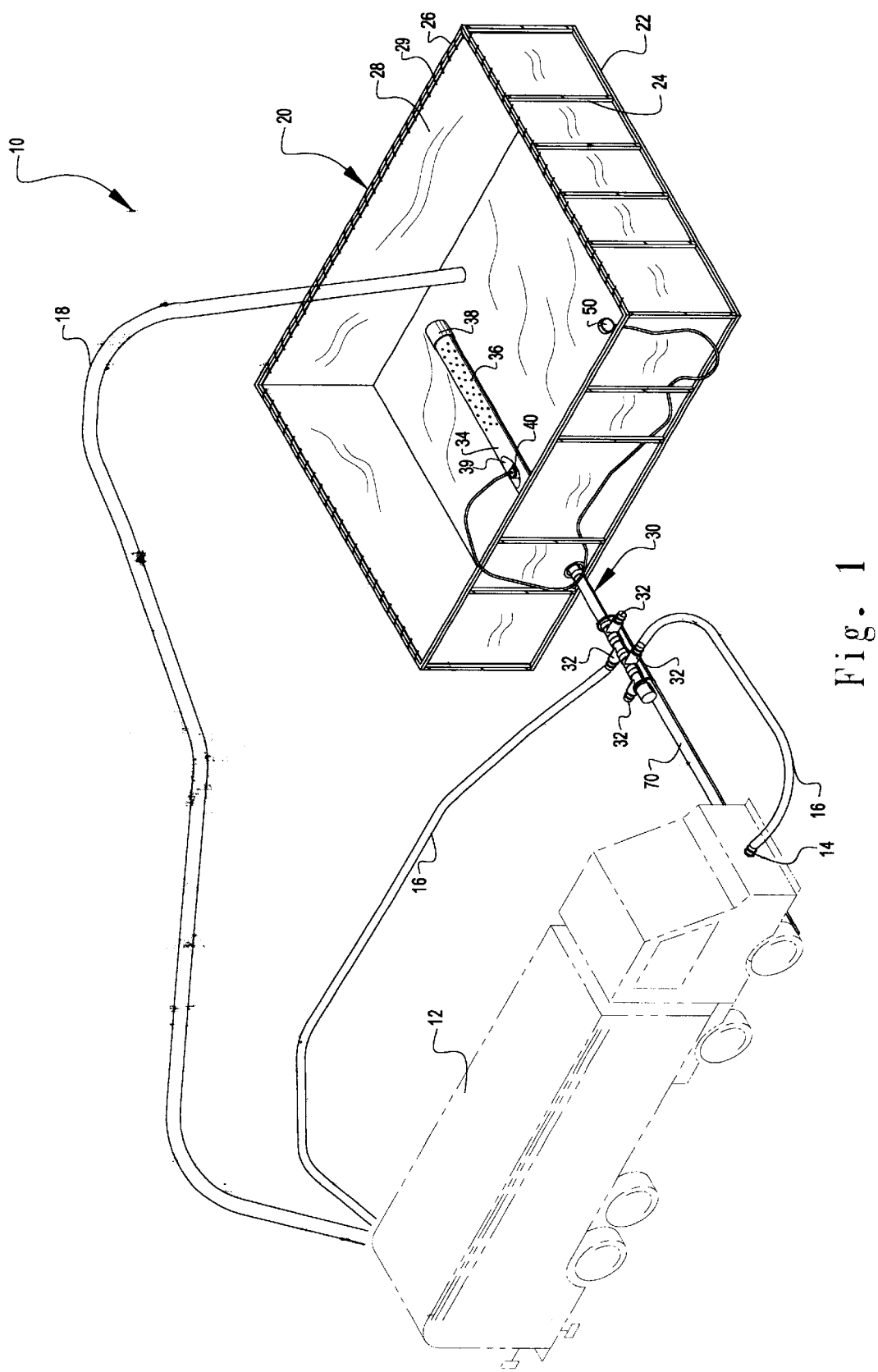
FIG. 1 is an upper perspective view of the present invention fluidly connected to a fire truck.

Turning now descriptively to the drawings, in which similar reference characters denote similar elements throughout the several view, FIGS. 1 through 4 illustrate a pump flow test system 10, which comprises a reservoir structure 20 for storing a volume of fluid, an intake manifold 30 having a plurality of intake inlets 32 extending into the reservoir structure 20, an elongate tube 34 extending into the reservoir structure 20 from the intake manifold 30, a pitot tube 40 positioned within the elongate tube 34 for measuring fluid flow, and a meter 50 attached to the pitot tube 40 for displaying the water flow through the elongate tube 34. The elongate tube 34 preferably has a cap 38 and a perforated portion 36 for allowing even distribution of the incoming water into the reservoir structure 20. In use, an intake hose 18 is positioned within the reservoir structure 20 for drawing water into the pumps of the fire truck 12. A plurality of dispensing hoses 16 are connected to the pump discharges 14 of the fire truck 12 and to the intake inlets 32 of the intake manifold 30 for delivering the water from the pumps of the fire truck 12 to the reservoir structure 20.

Figure 2:
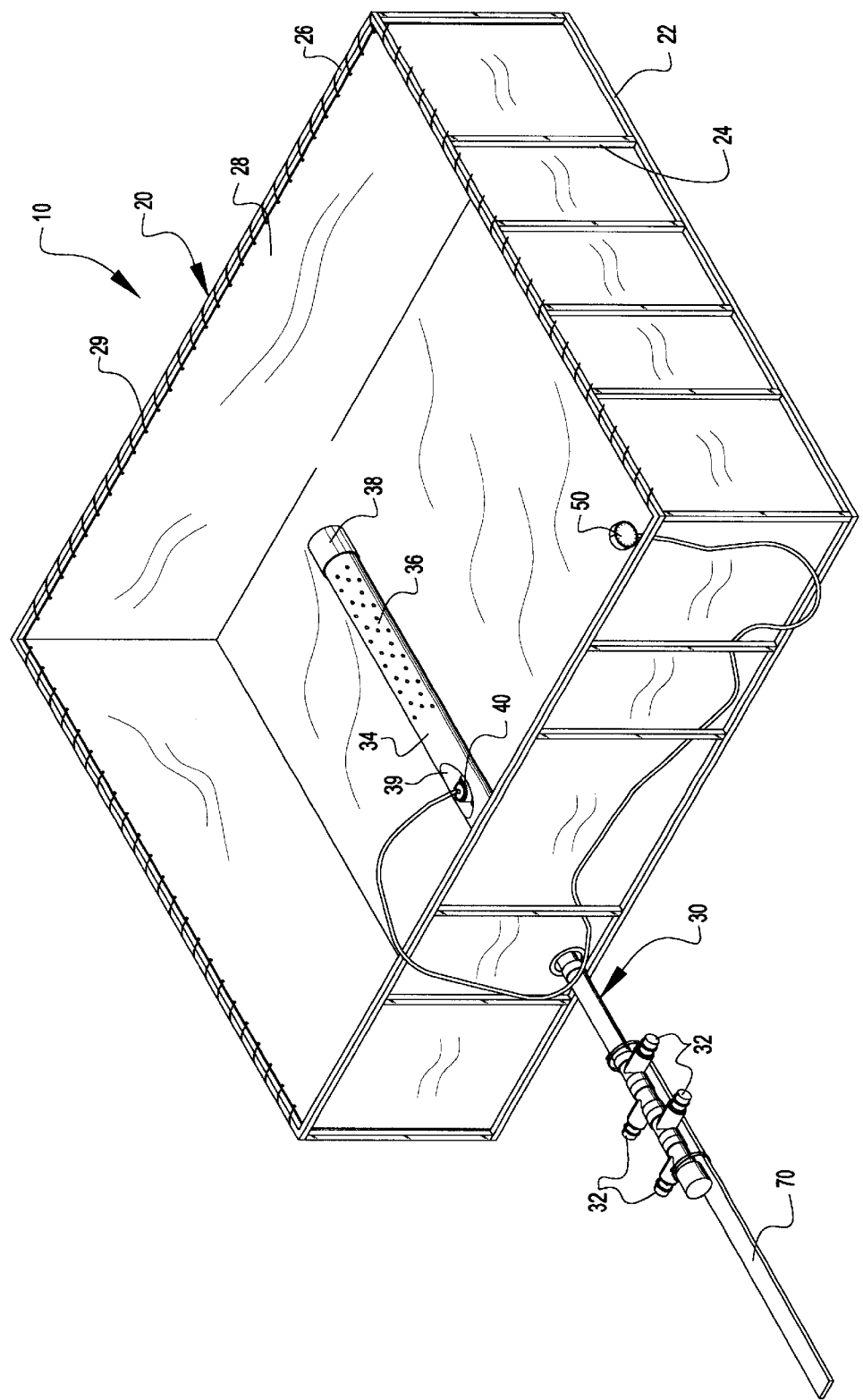
FIG. 2 is an upper perspective view of the present invention.

As shown in FIGS. 1 and 2 of the drawings, a reservoir structure 20 is provided for supporting a liner 28 thereby allowing the reservoir structure 20 to store a volume of fluid. The reservoir structure 20 preferably can be disassembled into a compact structure for transporting or storage. The reservoir structure 20 is generally comprised of a plurality of lower members 22, a plurality of upper members 26 and a plurality of vertical members 24 extending between the lower members 22 and upper members 26. An attachment string 29 attached to the liner 28 is positionable about the upper members 26 for supporting the liner 28 within the reservoir structure 20. There are various types of reservoir structures 20 that are foldable or non-foldable that can be utilized in conjunction with the present invention.

As shown in FIGS. 1 through 4 of the drawings, the intake manifold 30 is attached to the lower portion of the liner 28. The intake manifold 30 has a plurality of intake inlets 32 for receiving a plurality of dispensing hoses 16 from the fire truck 12.

As also shown in FIGS. 1 and 4 of the drawings, an elongate tube 34 extends from the intake manifold 30 into the lower portion of the reservoir structure 20 for dispensing the water below the water surface within the reservoir structure 20 thereby reducing any aeration within the water which can affect the test results.

As best shown in FIGS. 2 and 3 of the drawings, the elongate tube 34 has a perforated portion 36 for allowing the water to be dispersed evenly within the reservoir structure 20 without significant forces applied to the reservoir structure 20. The recoil tab 70 prevents the elongate tube 34 from being pushed from out of the reservoir structure 20 with the fire truck 12 retaining the recoil tab 70 and elongate tube 34 in a secured position. The distal end of the elongate tube 34 is preferably enclosed such as by a cap 38.

As shown in FIGS. 2 and 3 of the drawings, an opening 39 is within the upper portion of the elongate tube 34. A pitot tube 40 is positioned within the opening 39 for determining the amount of water flow through the elongate tube 34. A meter 50 is connected to the pitot tube 40 and secured to the reservoir structure 20 for displaying the volume of water flowing through the elongate tube 34.

In use, the user connects an intake hose 18 to the fire truck 12 and positions the opposing end into the reservoir structure 20 for drawing water from within the reservoir structure 20. A plurality of dispensing hoses 16 are fluidly connected to the pump discharges 14 of the fire truck 12 with the opposing ends fluidly connected to the intake inlets 32 of the intake manifold 30 as best shown in FIG. 1 of the drawings. The user operates the pumps within the fire truck 12 thereby drawing water into the pumps of the fire truck 12 and dispersing the water into the dispensing hoses 16 into the intake manifold 30 where the water is collected into an aggregate volume. The collected water then flows into the elongate tube 34 where the pitot tube 40, or other measuring device, measures the aggregate water flow through the elongate tube 34. The water continues to flow through the elongate tube 34 where after it is evenly dispensed through the perforated portion 36 of the elongate tube 34 without aeration.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pump flow test system, comprising:
   a reservoir structure for storing a volume of water, wherein said reservoir structure has an upper opening exposing an interior of said reservoir structure;
   an intake manifold having a first portion and a second portion, wherein said first portion is positioned within a lower portion of said reservoir structure and wherein said second portion extends outside of said reservoir structure having a plurality of intake inlets for receiving a plurality of dispensing hoses from a fire truck wherein pressurized water is forced from said fire truck into said intake manifold;

a measuring device positioned within said intake manifold for measuring an aggregate flow of water within said intake manifold from said second portion to said first portion; and a tube fluidly connected to said first portion of said intake manifold opposite of said second portion, wherein said tube has a perforated section for evenly dispensing water into the reservoir structure.

2. The pump flow test system of claim 1, wherein said measuring device is comprised of a pitot tube.

3. The pump flow test system of claim 1, wherein said measuring device includes a meter connected to said measuring device for constantly displaying water flow.

4. The pump flow test system of claim 1, wherein said reservoir structure is comprised of:

a plurality of lower members, a plurality of upper members;

a plurality of vertical members extending between said lower members and said upper members; and a liner attachable to said upper members forming an impermeable reservoir.

5. The pump flow test system of claim 1, wherein a distal end of said tube is enclosed.

6. The pump flow test system of claim 1, wherein said distal end includes a cap.

7. The pump flow test system of claim 4, wherein said liner includes an attachment string for removably securing about said upper members.

8. A pump flow test system, comprising:

a reservoir structure for storing a volume of water, wherein said reservoir structure has an upper opening exposing an interior of said reservoir structure;

an intake manifold having a first portion and a second portion, wherein said first portion is positioned within a lower portion of said reservoir structure and wherein said second portion extends outside of said reservoir structure having a plurality of intake inlets for receiving a plurality of dispensing hoses from a fire truck wherein pressurized water is forced from said fire truck into said intake manifold;

a measuring device positioned within said intake manifold for measuring an aggregate flow of water within said intake manifold from said second portion to said first portion;

a tube fluidly connected to said first portion of said intake manifold opposite of said second portion, wherein said tube has a perforated section for evenly dispensing water into the reservoir structure; and an elongate recoil tab attached to said second portion of said intake manifold extending a finite distance from said intake manifold to be secured to an object thereby preventing said intake manifold from extending from said reservoir structure.

9. The pump flow test system of claim 8, wherein said measuring device is comprised of a pitot tube.

10. The pump flow test system of claim 8, wherein said measuring device includes a meter connected to said measuring device for constantly displaying water flow.

11. The pump flow test system of claim 8, wherein said reservoir structure is comprised of:

a plurality of lower members, a plurality of upper members;

a plurality of vertical members extending between said lower members and said upper members; and a liner attachable to said upper members forming an impermeable reservoir.

12. The pump flow test system of claim 8, wherein a distal end of said tube is enclosed.

13. The pump flow test system of claim 8, wherein said distal end includes a cap.

14. The pump flow test system of claim 13, wherein said liner includes an attachment string for removably securing about said upper members.

* * * * *